United States Patent
Meroth

(10) Patent No.: US 7,333,118 B2
(45) Date of Patent: Feb. 19, 2008

(54) DEVICE AND METHOD FOR PROCESSING AN IMAGE TO BE DISPLAYED WITH A REDUCED NUMBER OF COLORS

(75) Inventor: Yan Meroth, Saint-Ismier (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 10/988,981

(22) Filed: Nov. 12, 2004

(65) Prior Publication Data
US 2005/0168478 A1 Aug. 4, 2005

(30) Foreign Application Priority Data
Nov. 14, 2003 (FR) .................. 03 13353

(51) Int. Cl.
*G09G 5/02* (2006.01)
(52) U.S. Cl. ..................................... 345/600
(58) Field of Classification Search ............ None
See application file for complete search history.

(56) References Cited

U.S. PATENT DOCUMENTS

| | | |
|---|---|---|
| 5,469,190 A | 11/1995 | Masterson |
| 5,495,346 A | 2/1996 | Choi et al. |
| 5,777,599 A | 7/1998 | Poduska, Jr. |
| 2003/0059084 A1* | 3/2003 | Miyake et al. ............. 382/100 |
| 2004/0051909 A1* | 3/2004 | Curry et al. ............... 358/3.08 |

FOREIGN PATENT DOCUMENTS

| | | |
|---|---|---|
| EP | 0 359 080 | 3/1990 |
| EP | 1 137 266 | 9/2001 |

OTHER PUBLICATIONS

French Preliminary Search Report dated Apr. 2, 2004 for French Application No. 0313353.

\* cited by examiner

*Primary Examiner*—Mark Zimmerman
*Assistant Examiner*—Kevin Xu
(74) *Attorney, Agent, or Firm*—Lisa K. Jorgenson; Jose Gutman; Fleit Kain Gibbons Gutman Bongini & Bianco P.L.

(57) ABSTRACT

A method and a device for processing an image to be displayed with a reduced number n of color components are disclosed. The method comprises, for at least one of the color components, a reduction operation that is carried out by means of a dynamic round off dependent on the position (x, y) of the pixel to display. Thus, in a very simple way, image processing preventing the occurrence of artifacts, flickering or other flaws that the reduction of the number of colors would inevitably produce, can be realized.

12 Claims, 2 Drawing Sheets

DEVICE AND METHOD FOR PROCESSING AN IMAGE TO BE DISPLAYED WITH A REDUCED NUMBER OF COLORS

CROSS-REFERENCE TO RELATED APPLICATION

This application is based upon and claims priority from prior French Patent Application No. 03 13353, filed on Nov. 14, 2003, the entire disclosure of which is herein incorporated by reference.

BACKGROUND OF THE INVENTION

1. Field of the Invention

The present invention relates to image processing and more particularly to a method for processing an image meant to be displayed with a reduced number of colors.

2. Description of the Related Art

Displaying images on a screen that has a restricted number of colors requires specific processing in order to avoid defects that are particularly annoying if no precaution is taken.

Indeed, in the absence of any corrective processing, when displaying an image coded, for example, into 16 million colors on a screen having a restricted number of colors (for example 4096 colors) one observes the appearance of moiré effects that do not form part of the original image. In video, flickering appears, moving areas that do not form part of the original video. In short, a number of localized visual defects generally known in the art as artifacts.

A number of techniques are known for reducing the occurrence of such artifacts. Generally, the known techniques are the product of a common approach, known as DITHERING. In all these techniques, small variations are made among the set of displayable colors (which is assumed to be restricted) so that these variations are assimilated by the eye and give the illusion of displaying a greater number of colors.

The first known technique—undoubtedly the simplest to implement—is based on the addition, for each displayed pixel, of a random noise to each color component. This technique makes it possible to somewhat reduce the moiré effect. On the other hand, the addition of random noise clearly damages the quality of the original image and generates grains in the resulting image as well as flickering in the case of a video.

In a second technique, known as ORDERED DITHERING, the image is processed before display by replacing areas containing non-displayable gradations by areas comprising displayable patterns, by analyzing a group of adjacent pixels. This technique is covered by the article: "*Frequency analysis of ordered dither*", SPIE vol 1079, 1989, p. 361-373, Ulichney and Robert. Generally, although it improves processing compared to the preceding technique, this technique produces new patterns (or artifacts) that are easily recognizable by the human eye. Moreover, in the case of a video, this technique causes flickering, and even moving areas that do not form part of the original video.

A third known technique, and undoubtedly the most sophisticated one, is described in the reference document "*An adaptive algorithm for spatial grayscale*" proceedings of the society for information display, vol 17, Nb2, p. 75-77, 1976, Floyd and Steinberg. This technique proceeds by diffusion of the error on one pixel (between the original image and the displayed image) onto adjacent pixels. Implementing this technique requires great computing power and consequently turns out to be expensive. Moreover, although it makes it possible to remove moiré effects and flickering, one nevertheless notes the appearance of a very grainy aspect that finally proves cumbersome. It is especially true for a video as it transforms into swarming.

All the known techniques that have been mentioned are classically used to process fixed images. Clearly, video image sequences require specific processing to avoid the appearance of other objects or artifacts that might not be perceived if the known techniques were applied to fixed images.

Accordingly, there exists a need for overcoming the disadvantages of the prior art as discussed above.

SUMMARY OF THE INVENTION

The object of the present invention is to provide an effective and not very expensive image processing technique that makes it possible to remove or at least to strongly reduce the occurrence of artifacts when the image or the images is/are displayed with a restricted number of colors.

Another object of the present invention consists in providing a method for processing an image that is particularly adapted to video sequences.

The invention achieves these objects by means of a method for processing an image to be displayed with a reduced number n of color components. The method comprises coding each one of the n color components and, for at least one of the color components, a reduction operation that is carried out by means of a dynamic round off, based on a set of thresholds which are selected by means of a sample counter. Thus it is possible to very simply carry out image processing in order to avoid artifacts, flickering or other flaws that the reduction of the number of colors would inevitably reveal.

Thus the method avoids modifying pixels that are displayable, which reduces degradation of the original image. At that point, less than one level of quantification from the real image is reached. Moreover, by establishing a relationship between round off management and pixel position within the image, the effects resulting from the introduction of random noise are avoided and the visual effect is greatly improved: there is no grainy aspect observable and moiré effects are very strongly reduced. The process according to the invention is particularly well adapted to video image processing. One does not observe the appearance of moving patterns, or flickering on the moving images that would be observed with traditional techniques.

To make moiré effects disappear, a compromise is made between, on the one hand, the fact of making small variations that can be integrated by the eye that then has the illusion of a greater number of colors and, on the other hand, the effects of too random a noise generating a grainy effect or the effects of too deterministic a noise generating patterns that the eye can easily detect.

Preferably, the dynamic round off is fixed by means of a THRESHOLD rule (n, x, y) depending in particular on the position of the pixel to display.

In a particular embodiment, dynamic rounding is carried out by means of a set of three thresholds ¼, ½ and ¾ that are successively used in the reduction operation of each color component.

Preferably, the obtained effect can be directed towards a preferred direction according to the sequencing order of the three thresholds, in order to improve the visual result of the system displaying the image.

The invention also provides a method for processing an image meant to be displayed with a reduced number n of color components, the processing comprising the following steps:

coding each one of the n color components;

incrementing at least one of the n color components by one value selected among a predefined set of values under control of a sample counter;

reducing the number of bits of the color component before display.

A further object of the invention is to realize a device for processing an image to be displayed with a limited number of colors. The device comprises coding means for each of the n color components and means for reducing at least one of the color components using a dynamic round off dependent on the position (x, y) of the pixel to be displayed.

BRIEF DESCRIPTION OF THE DRAWINGS

Other characteristics, objects and advantages of the invention will appear when reading the following description and accompanying drawings, only given by way of nonrestrictive examples, where.

DETAILED DESCRIPTION

Figure 1:
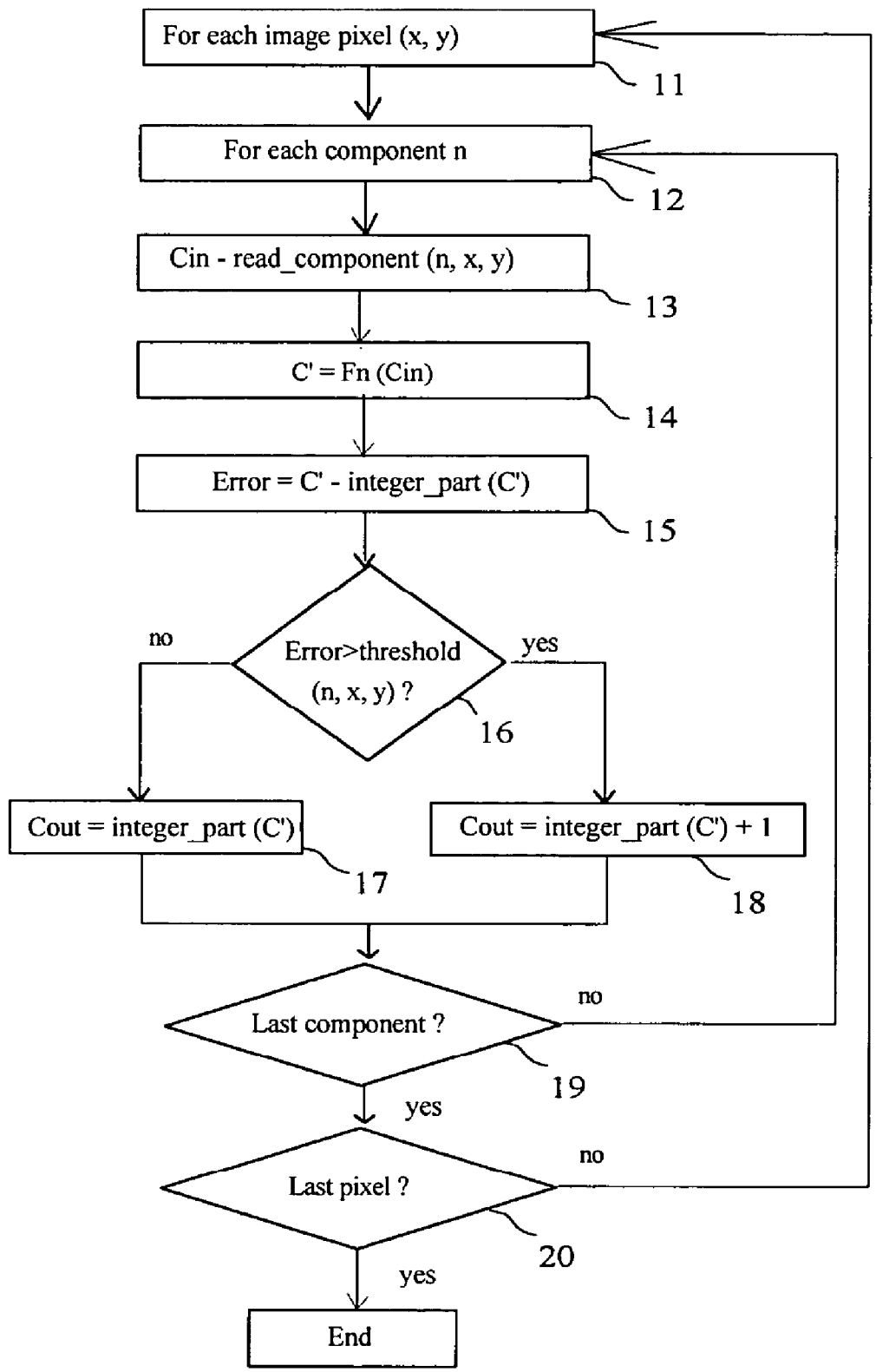
FIG. 1 illustrates an embodiment of the method according to the invention.

The method that will now be described is adapted to image processing—generally true color images (for example 24-bit coded images)—that are to be displayed with a reduced number of colors. One can quite naturally think of images to be displayed on portable computers having limited display capabilities, and of all portable devices, such as portable document assistants (PDAs) and even mobile telephones, which also have reduced display capabilities. Generally, one will consider any display device that can display, project, print or visualize color images with a limited number of colors. The method is also applicable even when one considers using a gradation mode display, namely a display that can display a great number of colors, but is used to display only a limited number of colors.

One will consider particularly, but not exclusively, the case of video type images because, as it will be shown, the invention applies in particular and advantageously to this type of images.

According to the principle of the invention, for each color component (Red, Green or Blue) a reduction of the number of colors is realized that is based on dynamically managing rounded values according to the position of the pixel within the image. For this purpose, at least a first and a second rounding rules are used that are applied according to a law depending on pixel position within the image.

Deterioration of the original image is thus limited. Indeed, contrary to known techniques and in particular those techniques based on the insertion of random noise, a pixel that is potentially displayable is not modified and will be displayed just as it is. Pixels whose colors correspond to the set of displayable colors are actually displayed with the adequate color components. By carrying out a simple dynamic management of round-offs—which remain round-offs—one ensures that color components that are displayable by the limited display device will be actually displayed and that each original component that is not displayable will be displayed using a selected displayable component chosen at less than one level of quantification of the display.

Thus the process according to the invention allows image processing that minimizes the deterioration of the objective quality of the original image.

Thus, a solution is found, by proceeding to small variations that the eye can assimilate to have the illusion of seeing more colors, whilst avoiding the effects of too random a noise that would generate grainy effect.

Round off management follows a law that is a function of the pixel's position within the image. Pseudo-random noise is thereby added, which limits the appearance of grainy effects and flickering on video image streams. Such pseudo-random addition does not depend on the value of neighboring pixels, which limits the appearance of distortions, i.e. of moving patterns on the video image stream.

Preferably, the first and second thresholds are set to ¾ and ¼ respectively, and a third threshold is added that represents traditional value ½. The method is applied with the sequence made up of the three preceding thresholds. The advantage of the method according to the invention can be noted, i.e. that it does not require values to be stored for each adjacent pixel (and in particular for pixels above and below located more than one scanning line away), which facilitates the implementation of a particularly cheap method.

FIG. 1 illustrates an embodiment of the invention in which the method is applied to the three color components, RGB (or Red-Green-Blue), of the image to be processed. When the original image is coded in YUV mode, if necessary, conversion to RGB mode is carried out. One will refer, for example and whenever necessary, to recommendation ITU-R BT.601 to proceed to such coding conversion.

The value of a component of a given pixel, in the original image, is noted $C_{in}$. $C_{in}$ is typically the true value of a component, as an 8-bit coded value for example. The value of the same component in the image when color reduction is carried out is noted $C_{out}$. $C_{out}$ corresponds to coding with a number of bits that, in general, is lower than that of $C_{in}$, such as 4-bit coding for example.

Fn is the function that is associated with the $n^{th}$ color component and that makes it possible to express the true component $C_{in}$ on a scale where integers correspond to the reduced set of colors. With such a scale, each integer included in [0, max] corresponds to a color that is displayable whereas intermediate values between two integers correspond to non-displayable true components.

With such coding, components can be reduced by means of a round off that is dynamically controlled as will now be seen in reference to FIG. 1.

The method starts at step 11 where the pixel (x, y) to be treated is initialized.

At step 12, the color component to be processed is initialized.

The method then continues with step 13 where the true value $C_{in}$ Of component n of the considered color is read.

At step 14, scaling is realized (to the scale in which the really displayable components are integers). To this effect, the following calculation is made:

$$C'=F_n(C_{in}).$$

At step 15, the error that is the mantissa of the previously calculated value C' is calculated:

$$\text{Error}=C'-\text{integer\_part}(C')$$

At this point, this value can be rounded, which round off expresses the difference between the true value of the component to be displayed and the value that is displayable by the considered display. Such rounding is carried out dynamically by means of a THRESHOLD (n, x, y) that depends on the position (x, y) of the considered pixel.

At step 16, the error calculated in step 15 is compared with the value THRESHOLD (n, x, y).

If the error is greater than the threshold, then the process goes to a step 18 in which rounding up is realized: $C_{out}$ is set to the immediately higher integer, according to the formula:

$$C_{out}=\text{integer\_part } (C')+1$$

If the error is lower than the threshold, then the process goes to a step 17 in where rounding down is realized: $C_{out}$ is set to the integer part of C':

$$C_{out}=\text{integer\_part } (C')$$

In particular, if $C_{in}$ is displayable, then C' is an integer and $C_{out}$ will be equal to C'. In other words, a displayable component will be actually displayed without modification.

At step 19, a test is carried out to determine if another color component must be processed, in which case the process returns to step 12. If not, the process continues with a step 20 in which a new test is carried out to determine if another pixel is to be processed, in which case the process goes back to step 11.

When all the pixels and all the components have been processed, the process is complete.

The method that has been just described in relation to FIG. 1 is very easy to implement, in particular by means of an architecture using logic circuit in great numbers and in particular flip-flops controlled by a gated clock. This makes it possible to reduce power consumption while maintaining the same storage function.

In practice, threshold THRESHOLD (n, x, y) will be chosen so that it depends only on the position (x, y) of the considered pixel and not on the color component. Thus, in a simple way, equal processing of all color components is ensured. This makes implementation of the method even simpler without losing in quality.

If THRESHOLD (n, x, y)=0.5, it can be noted that the principle of the <<nearest integer>> fixed round off applies.

If THRESHOLD (n, x, y)=0, then it comes down to the <<lower integer>> fixed round off. It should be noted that, in practice, this value should be avoided as it causes flickering in video stream. It should be noted that a <<higher integer>> round off is also to be avoided, as it gives place to the same defect in video stream.

It was found that remarkably interesting results were obtained, in particular regarding the respect of color gradations, when the values of THRESHOLD (n, x, y) were symmetrical to value 0.5. Moreover, values that are uniformly distributed across interval [0, 1] should be preferred.

In order to facilitate the implementation of the method, fractions of 2 raised to a power are used for the various values taken by THRESHOLD (n, x, y).

It should be noticed that, and this is a remarkable aspect, the comparing step 16 can be easily avoided in one preferred embodiment. Indeed, this can be achieved by simply incrementing the coded value before reduction with an increment controlled by a counter. This simply achieves the dynamic round off: for instance, before dividing the coded value by four (=$2^2$), it should be observed that an increase by one of the coded value will automatically cause, after reduction, the application of a round off with an equivalent threshold value being equal to 0.75. Similarly, an increase by two of the coded value before division by four will automatically result in the application of a round off with a value of 0.5, which is the traditional "nearest integer" round off. In the case of an increase by 3, followed by a division by four of the coded component, the round off will then be equivalent to the use of a threshold of 0.25.

One can thus see how easily the method can be implemented, without requiring complex matrix tables or even a comparator.

Figure 3:
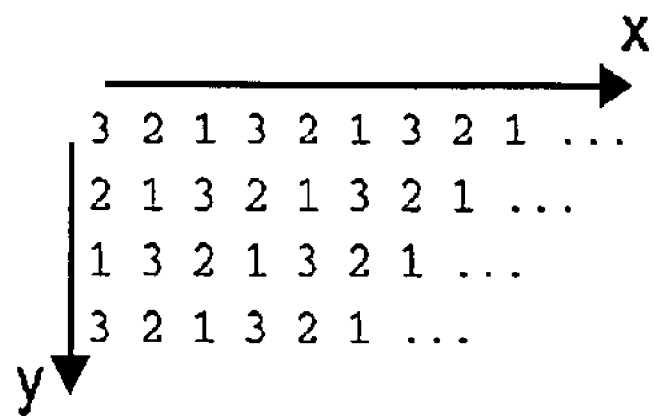
FIG. 3 illustrates a way of encouraging a 45° direction by means of a 3-2-1 counter.

In a preferred embodiment, the dynamic threshold mechanism is implemented by means of a set of three values: ¼; ½; ¾, which are particularly easy to realize by means of logic circuits. Dependence of the threshold on pixel position is carried out by means of a simple PixEL Counter/reverse counter (PELC) that makes it possible to implement the sequence ¼; ½; ¾; ¼; ½; ¾, ¼; ½; ¾ or (1,2, 3, 1,2, 3, 1, 2, 3 etc.). According to the image, this method tends to create one or more preferred directions in the resulting image, which only becomes perceptible in the event of strong color reduction (for example 4096 colors). Knowing that pixels are displayed in square form (for a LCD-type screen), or oblong form (cathode ray tube phosphine), the encouraged direction generated by use of a counter can be advantageously used to reinforce the obtained visual effect and to further improve quality of the display. FIG. 3 thus illustrates the manner of encouraging a 45 degrees direction by means of a 3-2-1 counter.

When the components of the original image are $N_n$-bit coded and the reduction of the number of colors changes them to $P_n$ bits<$N_n$, then function $F_n$ can be written as follows:

$$F_n=C/2^{Nn-Pn}$$

When the values of THRESHOLD(n,x,y) are fractions of 2 raised to a variable power, then THRESHOLD(n,x,y) can be written in its fractional form:

$$\text{THRESHOLD}(n,x,y)=\text{THRESHOLD}_q(n, X, y)/2^S$$

The method can then be written as follows:
For each pixel (x,y)
For each component n
$C_{in}$=read_component(n, x, y)
$C'=C_{in}+\text{Integer\_Part}(2^{Nn-Pn-S}*\text{THRESHOLD}_q(n,x,y))$
$C_{out}=C'[N_n+1, N_n-P_n+1]$
If $C_{out}>=2^{Pn}$
$C_{out}=2^{Pn}-1$
end if
end for
end for With C' [N+1,N-$P_n$+1] meaning that bits N+1 to N-$P_n$+1 of C' are accessed, i.e. the Pn+1 most significant bits of C'. In this form, the method only involves operations with integers and two raised to a power. Its implementation is then particularly effective.

In the preferred embodiment of the invention, one uses a PELC counter that successively takes values 3, 2 and 1. The corresponding threshold values are then ¾, ½ and ¼. An unusual course of the original image is realized, by means of a regular or not, rectangular paving. The image is originally RGB or YUV-coded, it is coded to 9 bits that are not marked by component. The color-reduced image is coded to $P_1$, $P_2$ and $P_3$, MSB aligned bits (Most Significant Bit) in a byte.

Figure 2:
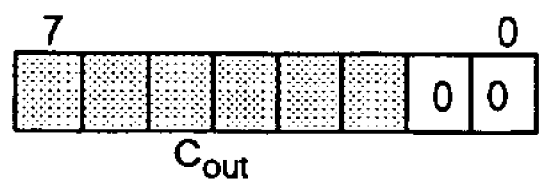
FIG. 2 represents an example of a 6-bit coding of value $C_{out}$.

With a component $C_{out}$ coded to $P_n$=6 bits at most, such as is illustrated in FIG. 2, realization is as follows:
pelc=3
Repeat
For n=1 to 3
$C_{in}$=read_component(n)
$C_1$ $C_{in}$+pelc*$2^{7-Pn}$

```
C₂=C₁[9, 1]
If C₂[8]==1
C₃=255
if not
C₃=C₂[7,0]
end if
C_out=bitand(C₃, 256-2^{8-Pn})
send(C_out)
end for
If pelc ==1
pelc=3
if not
pelc=pelc-1
end if
. . . as long as end_image==false
```

An example of application of the method is nomad video. $P_n$ can take value 4, 5 or 6. Preferably the processing method is then carried out by means of circuits that are simple to implement. It will be noted that no memory is needed since it is not necessary, contrary to some of the other known techniques, to store the adjacent pixels to process a given pixel.

The process that has been just described makes it possible to remove moiré effects and to avoid the formation of artifacts while preserving accuracy of the original image since pixels are only one level of quantification away, at maximum, from the original image. Moreover, it should be noted that this method is very simple to implement and that, consequently, it leads to largely reducing manufacturing cost of a hardware device implementing the method that has been just described. Finally it will be noted that the method does not introduce any processing delays, which authorizes its implementation for processing video images.

While there has been illustrated and described what is presently considered to be embodiments of the present invention, it will be understood by those of ordinary skill in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for processing an image meant to be displayed with a reduced number n of color components, the method comprising:
   coding each one of n color components; and
   reducing at least one of the n color components, such reduction being carried out by means of a dynamic round off based on a set of thresholds that are selected by means of a sample counter, wherein the dynamic round off is set by means of a set of three thresholds ¼, ½ and ¾ that are successively used in the reduction operation for each one of the color components.

2. The method according to claim 1, wherein the distribution of the thresholds is symmetrical with respect to the value 0.5.

3. The method according to claim 1, wherein the thresholds are fractions of two raised to a power.

4. The method according to claim 1, wherein the order of use of the three thresholds is fixed in order to encourage a direction close to 45 degrees on the image display system.

5. A device for processing an image with color reduction on a group of n color components, the device comprising: means for coding each of n color components; and means for reducing at least one of the color components by means of a dynamic round based on a set of threshold that's are selected by means of a sample counter wherein the dynamic round off is set by means of a set of three thresholds ¼, ½ and ¾ wherein each threshold is successively used in the reduction operation for each considered one of the color components.

6. The device according to claim 5, wherein a distribution of the set of thresholds is symmetrical with respect to the value 0.5.

7. The device according to claim 5, wherein the order of use of thresholds of the set of three thresholds is fixed in order to encourage a direction close to 45 degrees on an image display system.

8. The device according to claim 5, wherein the thresholds are fractions of two raised to a power.

9. An image display system, comprising:
   a memory;
   an image processing circuit, communicatively coupled with the memory;
   means, communicatively coupled with the image processing circuit, for coding each of n color components of an image; and
   means, communicatively coupled with the image processing circuit, for reducing at least one of the color components by means of a dynamic round off based on a set of thresholds which are selected by means of a sample counter, wherein the dynamic round off is set by means of a set of three thresholds ¼, ½ and ¾ that are successively used in the reduction operation for each considered one of the color components.

10. The system of claim 9, wherein a distribution of the set of thresholds is symmetrical with respect to the value 0.5.

11. The system of claim 9, wherein the order of use of three thresholds of the set of thresholds is fixed in order to encourage a direction close to 45 degrees on the image display system.

12. The system of claim 9, wherein each threshold of the set of thresholds is a fraction of two raised to a power.

* * * * *